E. BURTON.
ANIMAL YOKE.
APPLICATION FILED FEB. 2, 1909.
1,027,591.
Patented May 28, 1912.
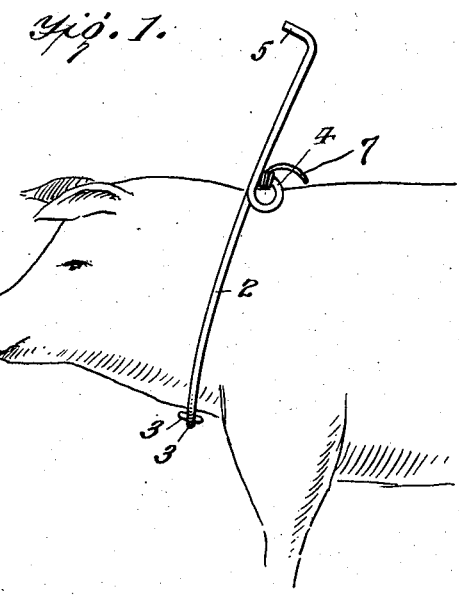
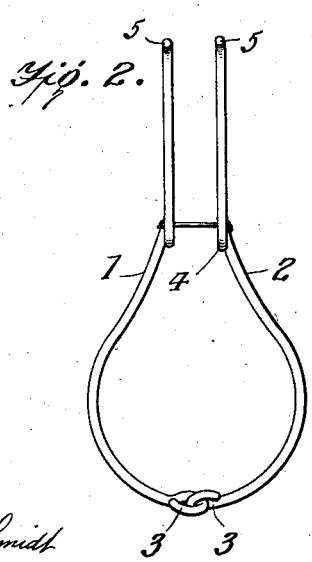
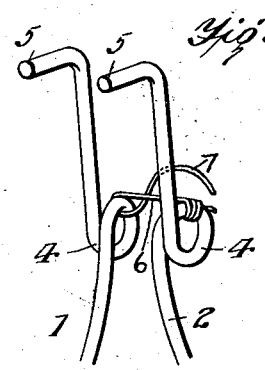
Inventor
E. Burton,
By D. Swift
Attorneys
Witnesses
J. H. Schmidt
R. Cot

UNITED STATES PATENT OFFICE.

ELMER BURTON, OF ADRIAN, MICHIGAN.

ANIMAL-YOKE.

1,027,591.     Specification of Letters Patent.     Patented May 28, 1912.

Application filed February 2, 1909. Serial No. 475,630.

*To all whom it may concern:*

Be it known that I, ELMER BURTON, a citizen of the United States, residing at Adrian, in the county of Lenawee and State of Michigan, have invented a new and useful Animal-Yoke; and I do hereby declare the following to be a full, clear, and exact description of the invention, such as will enable others skilled in the art to which it appertains to make and use the same.

The invention relates to an animal yoke and has for its object to provide a simple, efficient and durable device of this character designed especially for hogs for preventing them from pushing through wire fences and other kinds of closures.

With these and other objects in view, the invention consists in the novel construction and arrangement of parts hereinafter described and shown, and particularly pointed out in the appended claim.

In the drawings:—Figure 1 is a side elevation of my invention shown applied to a hog. Fig. 2 is a perspective view of the invention shown detached. Fig. 3 is a detail perspective view showing the construction of the punishment means of the yoke.

Referring to the drawings, 1 and 2 designate two members of my yoke which is preferably constructed of heavy wire or small iron rods and may be of various sizes. Each of the two members are provided with eyes 3 arranged on the lower end thereof and engage each other, thus forming a pivotal connection between the two members. At a point above the center, each of the two members is provided with a coil or loop 4. These loops are connected together by a stout wire 6. One end of the wire 6 is curved to form a neck engaging prong 7, whereby the animal will be punished by the prong being forced into its flesh when the yoke is engaged by a fence or other obstruction.

The upper ends of the two members are hooked as shown at 5, which hooks are designed to engage a wire of the fence which the hog attempts to pass through. When the hooks 5 engage the wire, immediately above the hog in addition to resisting his passage, the members will cause a choking action by means of the two members being pivoted at their lower end $a$.

While this invention is designed primarily for the use of hogs, it will be seen that the same could be applied to calves and other small animals.

What I claim is:

An animal yoke comprising two members, each member being formed of wire, the lower ends of said members being curved to engage the under side of an animal's neck and provided with engaging loops, each of the members being further formed with loops spaced apart from the upper ends thereof, the upper ends of the members being formed with angular fence engaging ends, and a wire member connecting the loops last mentioned, said wire member having a curved neck engaging end forming a punishment member.

In testimony whereof I have signed my name to this specification in the presence of two subscribing witnesses.

ELMER BURTON.

Witnesses:
   ELNORA HOOD,
   EMILY S. BATES.

---

Copies of this patent may be obtained for five cents each, by addressing the "Commissioner of Patents, Washington, D. C."